US012323435B2

(12) United States Patent
Siddiqui et al.

(10) Patent No.: US 12,323,435 B2
(45) Date of Patent: Jun. 3, 2025

(54) SYSTEM AND METHOD FOR MITIGATING RISK OF FRAUDS RELATED TO STREAMING CONTENT CONSUMPTION

(71) Applicant: Star India Private Limited, Mumbai (IN)

(72) Inventors: Shadab Siddiqui, Lucknow (IN); Rohan Gupta, Gurgaon (IN)

(73) Assignee: STAR INDIA PRIVATE LIMITED, Mumbai (IN)

( * ) Notice: Subject to any disclaimer, the term of this patent is extended or adjusted under 35 U.S.C. 154(b) by 422 days.

(21) Appl. No.: 17/851,525

(22) Filed: Jun. 28, 2022

(65) Prior Publication Data

US 2023/0007932 A1 Jan. 12, 2023

(30) Foreign Application Priority Data

Jul. 1, 2021 (IN) .............................. 202121029603

(51) Int. Cl.
*H04L 9/40* (2022.01)

(52) U.S. Cl.
CPC ........ *H04L 63/1416* (2013.01); *H04L 63/102* (2013.01)

(58) Field of Classification Search
CPC .............. H04L 63/102; H04L 63/1408; H04L 63/1416; H04L 63/1425; H04L 63/1441; H04L 2463/144; H04W 12/12; G06F 21/552; G06F 21/554
See application file for complete search history.

(56) References Cited

U.S. PATENT DOCUMENTS

| | | | | |
|---|---|---|---|---|
| 7,815,106 | B1* | 10/2010 | McConnell | G06Q 30/02 235/377 |
| 9,154,516 | B1* | 10/2015 | Vaystikh | H04L 63/1425 |
| 10,872,345 | B1* | 12/2020 | Walters | G06Q 20/4093 |
| 2015/0324698 | A1* | 11/2015 | Karaoguz | H04L 67/12 706/46 |
| 2016/0005044 | A1* | 1/2016 | Moss | G06Q 20/4016 705/44 |
| 2017/0134412 | A1* | 5/2017 | Cheng | H04L 67/306 |
| 2018/0167402 | A1* | 6/2018 | Scheidler | G06N 20/00 |
| 2018/0262521 | A1* | 9/2018 | Wang | H04L 63/1416 |
| 2018/0332072 | A1* | 11/2018 | Ford | H04L 9/3236 |
| 2019/0132224 | A1* | 5/2019 | Verma | G06F 18/24 |
| 2020/0242532 | A1* | 7/2020 | Kawamoto | G06Q 10/06393 |
| 2020/0334679 | A1* | 10/2020 | Sandepudi | G06N 5/01 |

(Continued)

*Primary Examiner* — Eric W Shepperd
(74) *Attorney, Agent, or Firm* — Evergreen Valley Law Group; Kanika Radhakrishnan

(57) ABSTRACT

A method and system for mitigating risk of frauds related to streaming content consumption is disclosed. Users' interaction data corresponding to a plurality of users of a digital platform related to streaming content is received. A set of users from the plurality of users is determined based on the users' interaction data. The set of users is determined based on the presence of at least one of an outlier event and an anomaly in their respective user interaction data. For each user of the set of users, a user breach profile for a user is generated; a fraud event is determined by applying at least one rule on the user breach profile; at least one action is triggered in response to a determination of the fraud event; and a risk score is determined for the user based on the user breach profile to monitor user interaction data of the user.

20 Claims, 9 Drawing Sheets

(56) References Cited

U.S. PATENT DOCUMENTS

| | | | |
|---|---|---|---|
| 2020/0356667 A1* | 11/2020 | Rodriguez Bravo | ........................ G06F 21/316 |
| 2021/0097546 A1* | 4/2021 | Adjaoute | ........... G06Q 30/0201 |
| 2021/0312286 A1* | 10/2021 | Shaik | ........................ G06N 3/08 |
| 2024/0020758 A1* | 1/2024 | Joglekar | ............ G06Q 30/0215 |

* cited by examiner

SYSTEM AND METHOD FOR MITIGATING RISK OF FRAUDS RELATED TO STREAMING CONTENT CONSUMPTION

RELATED APPLICATION(S)

This application claims the benefit of Provisional Patent Application Serial No. 202121029603, filed in India on Jul. 1, 2021, the disclosure of which is incorporated by reference herein in its entirety.

TECHNICAL FIELD

The present technology generally relates to the delivery of content, such as streaming content, to end-users and, more particularly, to a system and method for mitigating the risk of fraud related to streaming content consumption.

BACKGROUND

On-demand video streaming, as well as live streaming of content, has gained popularity in recent times and, subscribers are increasingly using a variety of electronic devices to access streaming content. The streaming content is accessed on the electronic devices using Over-The-Top (OTT) media services (i.e. over the Internet). The OTT streaming content providers typically use one or more Content Delivery Networks (CDNs) to deliver streaming content to the electronic devices of the subscribers.

With the increasing popularity of digital content streaming, instances of fraud committed in relation to the consumption of streaming content have also substantially increased. In one illustrative example, a subscriber may share login credentials of a personal subscription account and/or playback uniform resource locator (URL) associated with new streaming content with other consumers, who may then try to access/view the new streaming content without paying the subscription fees associated with viewing such content. In another illustrative example, a subscriber may illegally download the streaming content on a personal electronic device and thereafter upload the streaming content on one or more peer-to-peer sharing sites, causing the streaming content provider to lose ownership rights over the particular streaming content. In addition to the loss of ownership rights, such fraudulent actions may pose a security risk to the content sharing platform and also adversely affect the revenue of the entities associated with the streaming content, such as the OTT streaming content provider, and the content producer, etc.

Some platforms associated with the streaming content providers deploy a monitoring mechanism to track the activity of users on their platform. Further, predefined rules are put in place to raise an alarm or execute an action to limit the scope of the fraudulent action. For example, a rule may be set in place for a number of logins, say 5 logins allowed within a preset timeframe, such as one hour. If subscribers were to access the platform more than 5 times within one hour the subscribers would be denied access to the content on the platform. Such predefined and static nature of rules, though helpful, serve a limited purpose. However, in some scenarios, even if the subscriber is genuine the monitoring mechanism would deny access to the subscriber, when the subscriber tries to access the platform the sixth time. For example, a subscriber's device may have a software glitch causing the subscriber to automatically log off after a few minutes. In another illustrative example, a fraudulent user may have acquired knowledge of such a rule by making several trial-and-error attempts. Accordingly, the fraudulent user may only access the platform four times from multiple devices, so as to not trigger the rule. In such a case, the rule may not help in preventing fraudulent activity. Some monitoring mechanisms classify subscribers as 'good' or 'bad' based on historic behavior and accordingly, allow or limit access to content on the platform. However, such classification does not take into consideration changing the behavior of subscribers on the platform. For example, a subscriber may, over time, develop an affinity for illegal or fraudulent actions, such as downloading and sharing content. Even automated bots designed to target the platform keep changing their mode of attack over time. A static classification does not help in taking into consideration such changes in behavior or actions of subscribers over time.

Given the foregoing, there is a need for mitigating the risk of frauds related to streaming content consumption. Further, there is a need to create a dynamic and adaptive mechanism for detecting fraudulent actions and limiting the activity of fraudulent users without affecting a quality of service provided to genuine subscribers of platforms offering streaming content.

SUMMARY

In an embodiment of the invention, a computer-implemented method performed by a system for mitigating the risk of fraud related to streaming content consumption is disclosed. Users' interaction data corresponding to a plurality of users of a digital platform related to streaming content is received. A set of users from the plurality of users is determined based on the users' interaction data. The set of users is determined based on the presence of at least one of an outlier event and an anomaly in their respective user interaction data. The outlier event and the anomaly indicate an occurrence of fraudulent interaction of the set of users with the digital platform. For each user of the set of users, a user breach profile for a user is generated. The user breach profile comprises information related to at least one of the outlier event and the anomaly in user interaction data of the user and a breach history of the user. Further, a fraud event is determined by applying at least one rule on the user breach profile of each user of the set of users. Furthermore, at least one action is triggered for each user of the set of users in response to a determination of the fraud event. Thereafter, a risk score is determined for each user of the set of users based on the user breach profile to monitor user interaction data of the user upon triggering the at least one action.

In an embodiment of the invention, a system for mitigating the risk of fraud related to streaming content consumption is disclosed. The system includes memory and a processor. The memory stores instructions which are executed by the processor and causes the system to receive users' interaction data corresponding to a plurality of users of a digital platform related to streaming content. The system determines a set of users from the plurality of users based on the users' interaction data. The set of users is determined based on the presence of at least one of an outlier event and an anomaly in their respective user interaction data. The outlier event and the anomaly indicate an occurrence of fraudulent interaction of the set of users with the digital platform. For each user of the set of users, the system generates a user breach profile for the user. The user breach profile comprises information related to at least one of the outlier event and the anomaly in user interaction data of the user and a breach history of the user. Further, the system determines a fraud event by applying at least one rule on the user breach profile of each user of the set of users. Furthermore, the system triggers at least one action for each user of the set of users in response to a determination of the fraud event. Thereafter, the system determines a risk score for each user of the set of users based on the user breach profile upon triggering the at least one action.

In another embodiment of the invention, a computer-implemented method performed by a system for mitigating the risk of fraud related to streaming content consumption is disclosed. User interaction data corresponding to a user of a digital platform related to streaming content is received. One or more outlier events and one or more anomalies are detected from the user interaction data. The one or more outlier events and the one or more anomalies indicate occurrence of one or more fraudulent interactions of the user with the digital platform. A user breach profile is generated. The user breach profile includes information related to the one or more outlier events and the one or more anomalies detected from the user interaction data and a breach history of the user. A fraud event is determined by applying at least one rule on the user breach profile. Thereafter, at least one action is triggered in response to a determination of the fraud event.

BRIEF DESCRIPTION OF THE FIGURES

The advantages and features of the invention will become better understood with reference to the detailed description taken in conjunction with the accompanying drawings, wherein like elements are identified with like symbols, and in which.

The drawings referred to in this description are not to be understood as being drawn to scale except if specifically noted, and such drawings are only exemplary in nature.

DETAILED DESCRIPTION

The best and other modes for carrying out the present invention are presented in terms of the embodiments, herein depicted in FIGS. 1 to 8. The embodiments are described herein for illustrative purposes and are subject to many variations. It is understood that various omissions and substitutions of equivalents are contemplated as circumstances may suggest or render expedient but are intended to cover the application or implementation without departing from the spirit or scope of the invention. Further, it is to be understood that the phraseology and terminology employed herein are for the purpose of the description and should not be regarded as limiting. Any heading utilized within this description is for convenience only and has no legal or limiting effect.

The terms "a" and "an" herein do not denote a limitation of quantity, but rather denote the presence of at least one of the referenced items.

Figure 1:
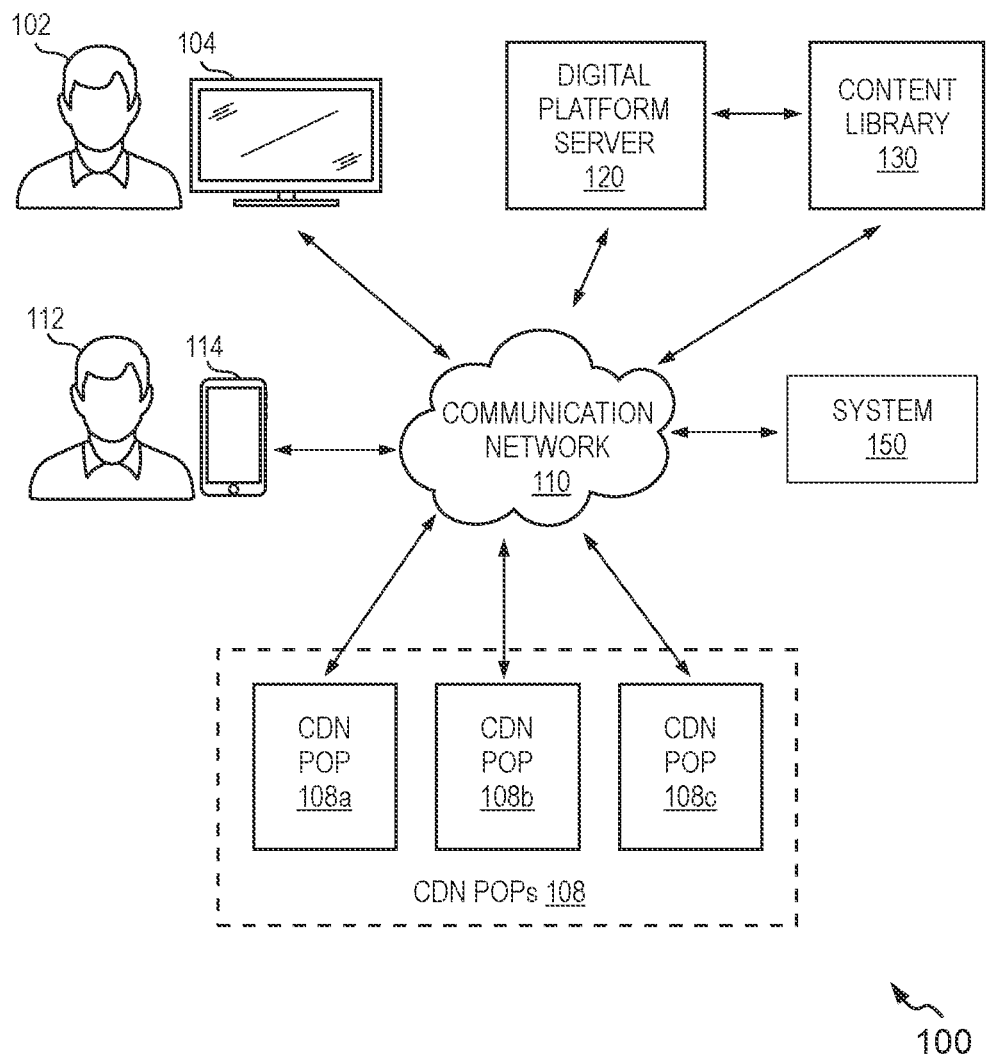
FIG. 1 is an example representation of an environment related to at least some example embodiments of the invention.

FIG. 1 is an example representation 100 of an environment related to at least some example embodiments of the invention. The representation 100 depicts a user 102 controlling an electronic device 104 for viewing/accessing content offered by a streaming content provider.

The term 'streaming content provider' as used herein refers to an enterprise owner of digital video content libraries, which offers video content on a subscription basis by using a digital platform and over-the-top (OTT) media services, i.e. the video content is streamed over the Internet to the electronic devices of the subscribers. A streaming content provider is hereafter referred to as a 'content provider' for ease of description. Though a content provider is not shown in FIG. 1, a digital platform server 120 and a content library 130 associated with a content provider are shown in the representation 100 and explained in further detail later.

The content offered by the content provider may be embodied as streaming video content such as live streaming content or on-demand video streaming content. Individuals wishing to view/access the streaming video content may subscribe to at least one type of subscription, such as a regular subscription or a premium subscription, offered by the content provider. Accordingly, the terms 'subscriber', 'user', and 'content viewer' as interchangeably used herein may refer to a viewer of subscribed content, which is offered by the content provider.

The user 102 (i.e. a subscriber of services offered by a content provider) may access a web interface corresponding to at least one content provider on the electronic device 104. Alternatively, the user 102 may have downloaded a software application (hereafter referred to as an 'application') corresponding to the at least one content provider on the electronic device 104. The electronic device 104 is depicted to be a Television (TV) for illustration purposes. It is noted that the user 102 may use one or more electronic devices, such as a smartphone, a laptop, a desktop, a personal computer, or any spatial computing device to view the content provided by the content provider. In one illustrative example, the user 102 may access the web interface associated with the content provider on the electronic device 104. It is understood that the electronic device 104 may be in operative communication with a communication network 110, such as the Internet, enabled by a network provider, also known as an Internet Service Provider (ISP). The electronic device 104 may connect to the communication network 110 using a wired network, a wireless network, or a combination of wired and wireless networks. Some non-limiting examples of the wired networks may include the Ethernet, the Local Area Network (LAN), a fiber-optic network, and the like. Some non-limiting examples of the wireless networks may include the Wireless LAN (WLAN), cellular networks. Bluetooth or ZigBee networks, and the like.

The electronic device 104 may fetch the web interface associated with the content provider over the communication network 110 and cause the display of the web interface on a display screen (not shown) of the electronic device 104. In an illustrative example, the web interface may display a plurality of content titles corresponding to the content offered by the content provider to its consumers. The content may include live streaming content (e.g., live concerts, professional sports, games, etc.) and non-live streaming content (e.g., video-on-demand, vlogs, etc.).

In an illustrative example, the user 102 may select a content title related to a live event (e.g., a sports match or a musical concert) from among the plurality of content titles displayed on the display screen of the electronic device 104. The selection of the content title may trigger a request for a playback Uniform Resource Locator (URL). The request for the playback URL is sent from the electronic device 104 via the communication network 110 to a digital platform server 120 associated with the content provider. The digital platform server 120 is configured to facilitate the streaming of digital content to a plurality of users, such as the user 102.

In at least some embodiments, the digital platform server 120 includes at least one of a Content Management System (CMS) and a User Management System (UMS) for authenticating and authorizing the user 102 and determining if the user 102 is entitled to view the requested content. To this effect, the digital platform server 120 may be in operative communication with one or more remote servers, such as an authentication server and an entitlement server. The authentication server and the entitlement server are not shown in FIG. 1. The authentication server may facilitate authentication of user account credentials using standard authentication mechanisms, which are not explained herein. The entitlement server may facilitate the determination of the user's subscription type (i.e. whether the user 102 has subscribed to regular or premium content) and status (i.e. whether the subscription is still active or is expired), which in turn may enable the determination of whether the user 102 is entitled to view/access the requested content or not.

The digital platform server 120 then identifies at least one Content Delivery Network (CDN) Point of Presence (PoP) which is in the proximity of the location of the user 102. As an illustrative example, three CDN PoPs 108 such as a CDN PoP 108a, a CDN PoP 108b, and a CDN PoP 108c, are depicted to be identified as CDN PoPs in the proximity of the location of the user 102 in FIG. 1. It is noted that the requested content may have been cached from a content library 130 of the content provider to the CDN PoPs 108a, 108b, and 108c. Further, the digital platform server 120 identifies an optimal CDN PoP from among the plurality of CDN PoPs for serving the user 102 with the requested content. The digital platform server 120 is configured to take into account, the location of the user 102, a content ID, performance metrics associated with the plurality of CDN PoPs 108a, 108b and 108c (collectively represented as '108'), and one or more routing policies for determining the most optimal CDN for serving the requested content to the user 102.

In an example scenario, the user 102 having subscribed to a premium membership offered by the content provider, may have watched a thriller web series content offered as premium content by the digital platform server 120. The user 102 may decide that such content may be of interest to a friend (shown as a user 112 in FIG. 1). However, the user 112 may not have a premium subscription and accordingly may not be entitled to watch the premium content on his electronic device 114. In such a scenario, the user 102 may pass either the playback URL of the content or share his account login credentials with the user 112 to allow the user 112 to watch the premium content on the electronic device 114. Such an action of sharing the playback URL or the sharing of account login credentials constitutes a 'fraud' or 'fraudulent interaction' as it allows the user 112 to illegally watch the premium content without paying for the premium subscription. In another illustrative example, the user 102 may have paid for watching premium content in India but tries to access the content when present in a different country, such as Australia. Again, such an action may constitute a 'fraud' as it violates the location rules as set by the content provider.

Some platforms associated with the streaming content providers deploy a monitoring mechanism to track the activity of users on their platform. Further, predefined rules are put in place to raise an alarm or execute an action to limit the scope of the fraudulent action. Such predefined and static nature of rules, though helpful, serve a limited purpose in preventing fraudulent activity. Further, some monitoring mechanisms classify subscribers as 'good' or 'bad' based on historic behavior and accordingly, allow or limit access to content available on the platform. However, such classification does not take into consideration changing the behavior of subscribers/consumers over time.

To overcome the aforementioned drawbacks and provide additional advantages, a system 150 for mitigating the risk of frauds related to streaming content consumption, is provided. The system 150 is configured to dynamically adapt and modify rules to detect fraudulent actions and limit the activity of fraudulent users without affecting the quality of service provided to genuine subscribers of the digital platform server 120 offering streaming content.

Figure 2:
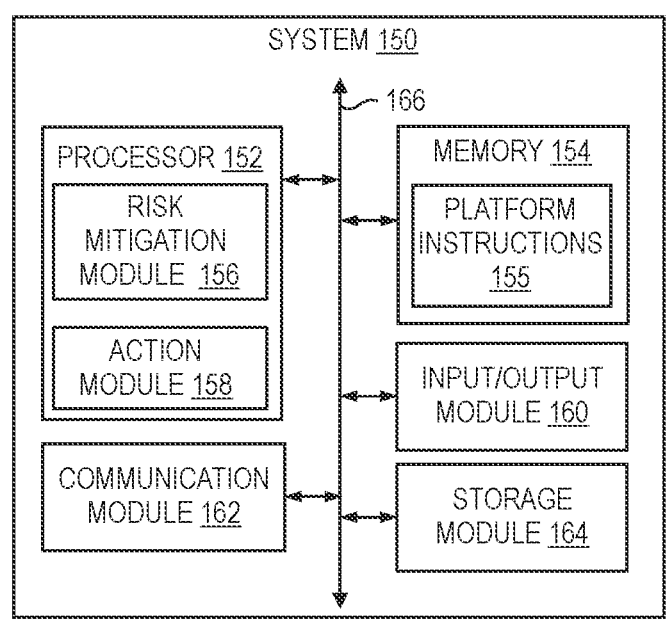
FIG. 2 is a block diagram of a system configured to mitigate the risk of frauds related to streaming content consumption, in accordance with an embodiment of the invention.

FIG. 2 is a block diagram of the system 150 configured to mitigate the risk of fraud related to streaming content consumption, in accordance with an embodiment of the invention. The system 150 may be implemented in a server accessible over the communication network 110 (shown in FIG. 1). For example, the system 150 may be implemented in one or more computing devices as part of a server entity and may be in operative communication with the digital platform server 120 (shown in FIG. 1). Alternatively, in at least some embodiments, the system 150 may be implemented within the digital platform server 120.

The term 'fraud' or 'fraudulent interaction' as used herein implies an intentional act performed by a consumer of streaming content, which is aimed to illegally derive a personal benefit, whether monetary or otherwise, causing a loss of business or posing a security threat to one or more stakeholders associated with the streaming content. An example of a stakeholder may be the streaming content provider (i.e. the OTT content provider), producers and artists associated with the streaming content, other genuine subscribers of the streaming content, etc. One example of fraud is 'piracy', where the content is illegally downloaded or copied onto a local machine, such as a personal electronic device, and the content is then shared with other users, who are not entitled to view such content. Another example of fraud is using multiple devices to simultaneously login into a single subscribed account, thereby attempting prohibited use of the subscription. Yet another example of fraud is sharing of account credentials with multiple non-entitled users, who may then access the streaming content at different times from multiple locations.

The term 'mitigating the risk of frauds related to streaming content consumption' as used herein implies either completely eliminating or at least reducing the instances of frauds committed in relation to consuming, i.e. viewing/accessing, of streaming content by users of the streaming content.

The system 150 includes at least one processor, such as a processor 152 and a memory 154. It is noted that although the system 150 is depicted to include only one processor, the system 150 may include more number of processors therein. In an embodiment, the memory 154 is capable of storing machine-executable instructions, referred to herein as platform instructions 155. Further, the processor 152 is capable of executing the platform instructions 155. In an embodiment, the processor 152 may be embodied as a multi-core processor, a single-core processor, or a combination of one or more multi-core processors and one or more single-core processors. For example, the processor 152 may be embodied as one or more of various processing devices, such as a coprocessor, a microprocessor, a controller, a digital signal processor (DSP), a processing circuitry with or without an accompanying DSP, or various other processing devices including integrated circuits such as, for example, an application-specific integrated circuit (ASIC), a field-programmable gate array (FPGA), a microcontroller unit (MCU), a hardware accelerator, a special-purpose computer chip, or the like. In an embodiment, the processor 152 may be configured to execute hard-coded functionality. In an embodiment, the processor 152 is embodied as an executor of software instructions, wherein the instructions may specifically configure the processor 152 to perform the algorithms and/or operations described herein when the instructions are executed.

The processor 152 is depicted to include a risk mitigation module 156 and an action module 158. The modules of the processor 152 may be implemented as software modules, hardware modules, firmware modules, or as a combination thereof.

The memory 154 may be embodied as one or more volatile memory devices, one or more non-volatile memory devices, and/or a combination of one or more volatile memory devices and non-volatile memory devices. For example, the memory 154 may be embodied as semiconductor memories (such as mask read-only memory (ROM), PROM (programmable ROM), EPROM (erasable PROM), flash memory, RAM (random access memory), etc.), magnetic storage devices (such as hard disk drives, floppy disks, magnetic tapes, etc.), optical magnetic storage devices (e.g., magneto-optical disks), CD-ROM (compact disc read-only memory), CD-R (compact disc recordable), CD-R/W (compact disc rewritable), DVD (Digital Versatile Disc) and BD (BLU-RAY® Disc).

In at least some embodiments, the memory 154 stores logic and/or instructions, which may be used by modules of the processor 152, such as the risk mitigation module 156 and the action module 158, for detecting the frauds and mitigating the risk of frauds related to streaming content consumption. For example, the memory 154 includes logic for identifying anomalies in user interaction data, generating risk profiles for users based on detected anomalies, detecting and validating fraud events, initiating security actions based on fraud events, monitoring the performance of rules, and adapting threshold values and baselines profiles based on the rule monitoring, etc.

The system 150 further includes an input/output module 160 (hereafter referred to as an 'I/O module 160') and at least one communication module such as a communication module 162. In an embodiment, the I/O module 160 may include mechanisms configured to receive inputs from and provide outputs to the operator(s) of the system 150. To that effect, the I/O module 160 may include at least one input interface and/or at least one output interface. Examples of the input interface may include, but are not limited to, a keyboard, a mouse, a joystick, a keypad, a touch screen, soft keys, a microphone, and the like. Examples of the output interface may include, but are not limited to, a display such as a light-emitting diode display, a thin-film transistor (TFT) display, a liquid crystal display, an active-matrix organic light-emitting diode (AMOLED) display, a microphone, a speaker, a ringer, a vibrator, and the like. In an example embodiment, the processor 152 may include I/O circuitry configured to control at least some functions of one or more elements of the I/O module 160, such as, for example, a speaker, a microphone, a display, and/or the like. The processor 152 and/or the I/O circuitry may be configured to control one or more functions of the one or more elements of the I/O module 160 through computer program instructions, for example, software and/or firmware, stored on a memory, for example, the memory 154, and/or the like, accessible to the processor 152.

The communication module 162 may include communication circuitry such as for example, a transceiver circuitry including an antenna and other communication media interfaces to connect to a communication network, such as the communication network 110 shown in FIG. 1. The communication circuitry may, in at least some example embodiments enable the reception of user interaction data from a plurality of users of a platform, such as the digital platform server 120 (shown in FIG. 1), or from any data source, such as a data lake associated with the content provider, which is configured to maintain real-time information related to user interactions with the platform associated with the content provider. The communication circuitry may, in at least some example embodiments enable the reception of user interaction data from the user device in real-time. The communication circuitry may further be configured to enable the transmission of signals corresponding to security actions to be performed on subscribers' electronic devices (e.g., the electronic device 104 of the user 102) in response to detected breaches or frauds committed in relation to streaming content consumption.

The term 'user interaction data' as used herein refers to data captured in relation to any interaction the user has with the platform associated with the content provider, such as the digital platform server 120 shown in FIG. 1. Some examples of interactions performed by a subscriber include, but are not limited to, login into a subscribed account, logout from the subscribed account, selection of a content to watch from among a plurality of content options, viewing the selected content, selecting a content trailer to watch, providing a content review, switching between content items or content genres, watching advertisements while watching the content, and the like. Each interaction may cause the generation of one or more data packets, which capture information not only related to the user action, but also related to device type, internet protocol (IP) address, user location, viewing time, overall time duration, trailers/advertisements presented/watched, content genre, etc. Such information is referred to herein as user interaction data, and the data packets including the user interaction data are transmitted from the user's electronic device to a content repository, such as a data lake (not shown in FIG. 2), associated with a content provider. In one example embodiment, the user interaction data is the data that is stored in the system 150 in real-time while the user is accessing the platform. In another example embodiment, the user interaction data may be accessed directly from the user device without storing the data in an external server. For example, the user device can record information related to the interaction of the user with the platform, and that user interaction data (such as timestamp logs and cookies on the user device) is retrieved and sent to the system 150 in real-time, when the user accesses the platform. The user interaction data may include interaction data stored on the server and interaction data retrieved from the user device. Further, the user interaction data may include configurable multiple fields (headers/data types), particularly data related to user (user ID, name, age, gender, location, user device, operating system (OS), player, other demographic details), and data related to streaming content (content ID, content title, content language, loading time, quality, resolution, playback time, bitrate, ads, user clicks, and other related).

The system 150 is further depicted to include a storage module 164. The storage module 164 is any computer-operated hardware suitable for storing and/or retrieving data. In one embodiment, the storage module 164 includes a repository for storing user profiles, user history, user risk profiles, and the like, generated from users' interaction data associated with a plurality of users. The storage module 164 may include multiple storage units such as hard drives and/or solid-state drives in a redundant array of inexpensive disks (RAID) configuration. In some embodiments, the storage module 164 may include a storage area network (SAN) and/or a network-attached storage (NAS) system. In one embodiment, the storage module 164 may correspond to a distributed storage system, wherein individual databases are configured to store custom information, such as user interaction data logs, and user breach logs for the plurality of users.

In some embodiments, the processor 152 and/or other components of the processor 152 may access the storage module 164 using a storage interface (not shown in FIG. 2). The storage interface may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing the processor 152 and/or the modules of the processor 152 with access to the storage module 164.

The various components of the system 150, such as the processor 152, the memory 154, the I/O module 160, the communication module 162, and the storage module 164 are configured to communicate with each other via or through a centralized circuit system 166. The centralized circuit system 166 may be various devices configured to, among other things, provide or enable communication between the components of the system 150. In certain embodiments, the centralized circuit system 166 may be a central printed circuit board (PCB) such as a motherboard, a main board, a system board, or a logic board. The centralized circuit system 166 may also, or alternatively, include other printed circuit assemblies (PCAs) or communication channel media.

In at least one example embodiment, the communication module 162 is configured to receive user interaction data related to each of a plurality of users in substantially real-time from the data lake. It is noted that the data lake is a storage repository configured to store user interaction data received from each electronic device of the plurality of users accessing the web interface related to the content provider. The communication module 162 is configured to forward the user interaction data corresponding to the plurality of users to the processor 152. The modules of the processor 152 in conjunction with the instructions stored in the memory 154 may be configured to process the user interaction data to identify outlier events and anomalies in user behavior and detect the occurrence of fraud events. The processing of the user interaction data by the risk mitigation module 156 of the processor 152 is explained next with reference to FIG. 3.

Figure 3:
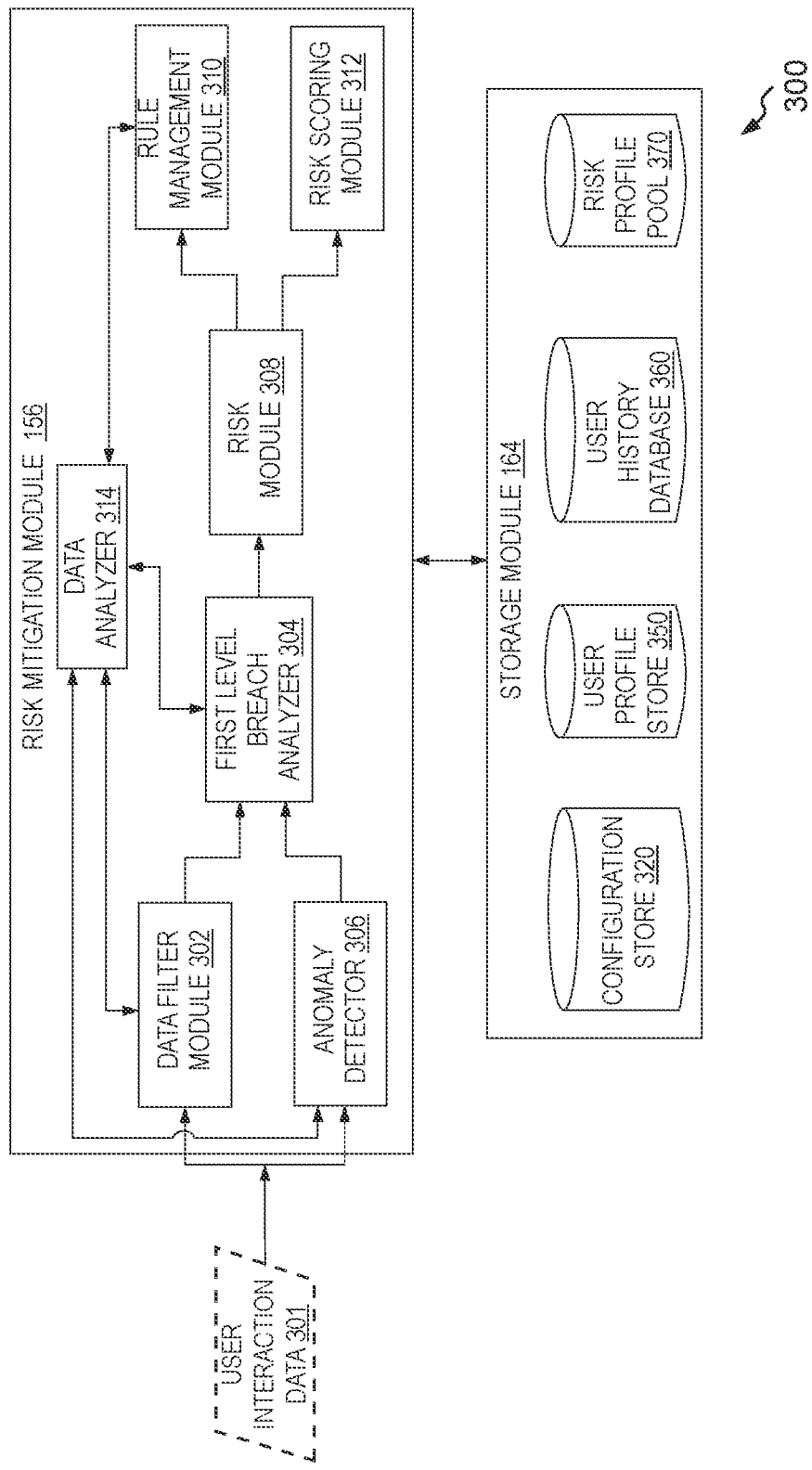
FIG. 3 is a block diagram of a risk mitigation module of the system of FIG. 2 in accordance with an embodiment of the invention.

FIG. 3 is a block diagram 300 of the risk mitigation module 156 of the processor 152 (shown in FIG. 2), in accordance with an embodiment of the invention. As mentioned with reference to FIG. 2, the communication module 162 is configured to receive user interaction data 301 (hereafter referred to as 'user interaction data') related to each of a plurality of users (i.e. streaming content consumers) in substantially real-time. The communication module 162 is configured to forward the received user interaction data to the processor 152. The risk mitigation module 156 within the processor 152 is configured to receive the user interaction data corresponding to each of the plurality of users. The risk mitigation module 156 may be in operative communication with the memory 154 (shown in FIG. 2) and the storage module 164 (shown in FIG. 2) for detecting an occurrence of fraud related to streaming content consumption and mitigating risk related to fraud, which will be explained in further detail hereafter.

The risk mitigation module 156 is depicted to include a data filter module 302, first level breach analyzer 304, an anomaly detector 306, a risk module 308, a rule management module 310, a risk scoring module 312, and a data analyzer 314.

The data filter module 302 is configured to receive raw user interaction data (i.e. the user interaction data 301) corresponding to each of a plurality of users of streaming content. The data filter module 302 includes a plurality of filters (not shown in FIG. 3) for performing a first level of a filtering operation on the user interaction data corresponding to each user. More specifically, the user interaction data corresponding to each user is analyzed to extract one or more characteristic values and the one or more characteristic values are compared with respective baseline threshold values to detect the presence of any outlier events (hereafter referred to as 'outliers'). For example, the outlier event can be at least one of a user logging in from different devices or different locations, a user downloading in odd hours, once in a while user turning into a frequent user, a user changing IP address, a user continuously active for more than 12 Hours, users providing fake reviews, ratings, anonymous users with multiple subscriptions, and users without any friends in-network or contacts in the phonebook. The list of outlier events is for exemplary purposes and the list of outlier events is not limited to the above events.

In an illustrative example, the data filter module 302 receives user interaction data corresponding to four users—user A, user B, user C, and user D. As explained with reference to FIG. 2, the user interaction data may include information related to actions/interactions performed by a respective user when present on the platform of the OTT content provider. Some examples of user interaction data may include information related to actions like login events, selection of content/trailers/reviews/ratings/advertisements to watch, type of device used for accessing the platform, a network used for accessing the platform, IP address, location, the timing of login and selection events, and the like. Each of these individual actions has a characteristic value within the user interaction data that may be provided to a respective data filter within the data filter module 302 to detect outliers. In one illustrative example, user A may have logged in five times within one session and here the characteristic value for logging in is five. A data filter configured to analyze user logins may compare the number of logins with a baseline login number (say 'four' for example) and determines that the number of logins for user A is indeed more than a baseline user login behavior. It is noted that the baseline threshold value, such as the baseline login number, may be retrieved from a configuration store 320 in the storage module 164. More specifically, the storage module 164 stores baseline threshold values for all filter operations in the configuration store 320. In another illustrative example, the number of user locations or the number of devices used by a user within a predefined time window may also be compared with the respective baseline threshold value retrieved from the configuration store 320. For example, a baseline user behavior may suggest one or at the most two distinct locations spaced 100 km apart within six hours. If this limit is exceeded, then the user behavior is indicative of an outlier. Accordingly, each data filter within the data filter module 302 may retrieve its respective baseline threshold value from the configuration store 320 in the storage module 164 and compare the relevant information within the user interaction data for each user to determine whether the user interaction data is indicative of an outlier or not.

In another illustrative example, user interaction data corresponding to user C may suggest two requests for the same playback URL from two different devices simultaneously. Further, one device may be associated with a different location. The data filters in the data filter module 302 may compare relevant information in such user interaction data with a respective baseline threshold value to determine that the user interaction data associated with user C includes an outlier.

In one example scenario, the data filter module 302 may determine that only user interaction data associated with user A and user C may be termed as outliers events, whereas the user interaction data associated with user B and user D seem to display expected or regular user behavior. Accordingly, the data filter module 302 may be configured to forward only the user interaction data corresponding to users A and C to the first level breach analyzer 304. More specifically, the data filter module 302 filters out user interaction data corresponding to genuine users, whereas only user interaction data corresponding to potentially suspect users is retained and forwarded to the first level breach analyzer 304. In other words, the data filter module 302 serves as a funnel for narrowing down risk assessment to only those users or a set of users, whose interaction data shows outlier behavior. It is noted that the filtering of user interaction data is explained with reference to four users A, B, C. and D for illustration purposes, and it is understood that the data filter module 302 may be capable of processing user interaction data corresponding to millions of users of streaming content. Furthermore, it is noted that the data filters explained in conjunction with the aforementioned example should not be limited by respective types as mentioned herein. Indeed, the number of data filters and type of data filters may be adapted over time to optimize outlier detection.

In one example embodiment, the baseline threshold values define the normal behavior of a user. The baseline threshold values may be different for each user and are defined by the content provider for each user or a group of users. In another example embodiment, the baseline threshold values may be adapted or modified dynamically based on the analysis of the detection of outliers. For example, the baseline threshold value related to a number of user logins can be changed to 'three' from 'four', when there are lesser detections of outliers related to user logins. Similarly, the baseline threshold value related to the distance between locations for consecutive logins can be changed based on analyzing the average detection of outliers for a certain time period with the current baseline threshold value. The baseline threshold values can be modified by the system 150 in real-time for a user based on aggregated detection of outliers for a certain time period. For example, the baseline threshold values for characteristic values such as the number of logins and distance between locations of consecutive logins in a time period for a user are '4' and '100 Km' for a time period of '6 Hours'. The above baseline threshold values can be dynamically changed based on the aggregated detection of outliers over a period of time.

The anomaly detector 306 is also configured to receive the user interaction data corresponding to each of the plurality of users. The anomaly detector 306 is configured to detect anomalies in the user interaction data. It is noted that the detection of outliers and anomalies in the user interaction data is performed with different objectives. For example, the 'outliers' provide an indication of user interaction data standing out when compared to preset baseline threshold values. The outlier analysis does not take into account a change in a user's current interaction vis-à-vis how the user has interacted in the past or how other users are interacting given a time of the day, day of the week, type of content, and the like. For example, if a user has historically watched only sports and biography-related content and the current interaction data indicates that the user has requested access to watch anime content, then such a change may be considered anomalous behavior given the user's historical viewing preferences. Similarly, if majority of users show a distinct spike in requesting playback URLs during 8 PM to 11 PM slot and another user has requested a very high number of URLs in the 3 AM to 5 AM slot, then such an interaction may be considered as anomalous vis-à-vis how other users are interacting with the platform associated with the content provider. The processing performed by the anomaly detector 306 is explained later with reference to FIG. 4.

The first level breach analyzer 304 is configured to receive users' interaction data associated with a set of users corresponding to the detected outliers from the data filter module 302 and the anomalies from the anomaly detector 306. The first level breach analyzer 304 is configured to identify the user interaction data, which is flagged by both the data filter module 302 (for example, by highlighting the outliers) and the anomaly detector 306 (for example, by identifying the anomalies) and select such user interaction data as potential fraud event and forward such information to the risk module 308. In some embodiments, the user interaction data, which is associated with either outliers or anomalies may be forwarded to the risk module 308 by the first level breach analyzer 304.

The risk module 308 is configured to control the flow of information between different modules of the risk mitigation module 156. The risk module 308 is configured to receive the users' interaction data corresponding to the set of users associated with outliers/anomalies from the first level breach analyzer 304. The risk module 308 is configured to identify at least one of a user, a user identifier, a user's device, a user's IP address, etc. from the received user interaction data and thereafter fetch or retrieve relevant historical details from a user history database 360 in the storage module 164. For example, a user may be identified from the user interaction data received from the first level breach analyzer 304, and all the historical details related to the breaches/transgressions committed by the user in the past are retrieved from the user history database 360. More specifically, the user identifier of the user may be used to identify devices and/or the IP addresses used by the user in the past and accordingly, breaches/transgressions committed by the user using the devices and/or the IP addresses in the past are retrieved from the user history database 360. The historical details related to the breaches/transgressions committed by the user in the past are referred to as 'breach history' hereafter. In addition to the historical details related to the breaches/transgressions committed by the user in the past, the breach history may also include information related to user's interactions, such as past actions, past content preferences, past content selections, and the like. It is noted that, in some embodiments, the breach history may be retrieved from the user history database 360 based on the user identifier, the device, or the IP address identified in the user interaction data received by the risk module 308. The risk module 308 is configured to append the breach history with current outlier/anomaly behavior information to configure a user breach profile. To that effect, the user breach profile is generated for each breach corresponding to each of the risk parameters such as 'Payment'. 'Account Access' and 'Service Request', and, indeed a variety of other risk parameters that define abnormal activity or security threats to a digital platform. The user breach profile includes an indicator to identify breaches related to any of the risk parameters. For example, a user breach profile for user A may be generated when there is a breach related to payment (i.e. when user A tries to bypass the payment gateway to access premium content) and the user breach profile includes an indicator to identify that user A has committed a breach related to payment. In an example embodiment, the risk module 308 is configured to update the user breach profile based on breach history and new outlier/anomaly behavior information identified in future iterations. For example, the user breach profile generated based on current outlier/anomaly behavior information and breach history can be updated upon detection of new outlier/anomaly behavior. The user breach profile is provided to the rule management module 310 and the risk scoring module 312. In one example embodiment, the user breach profile may be generated when the user is a newly registered user and the user breach profile may be updated when the user is an old user who already has a user breach profile.

The rule management module 310 includes a plurality of rules, which are configured to confirm the presence (or absence) of a fraud event. The rule management module 310 is configured to receive the user breach profile and perform a fraud check by running the rules on the received user breach profile. If any of the rules are violated, then the presence of the fraud (i.e. a fraud event) is confirmed. If none of the rules are violated, then it is determined that a fraud event has not occurred. In at least some embodiments, the rule management module 310 is configured to fetch a plurality of rules based on the user breach profile from the configuration store 320 in the storage module 164.

In one illustrative example, a user may have subscribed to watch premium content in India, however, he may continue to access the premium content from a different country. The location of the user may be identified as an outlier or, moreover, the access of the premium content may be tagged as anomalous behavior by the data filter module 302 and the anomaly detector 306, respectively. The risk module 308 may generate a user breach profile and provide such information to the rule management module 310. Among several rules that the user interaction data may be subjected to, by the rule management module 310, one example rule may be as follows:

```
If
    Dist (IP_address_current) ≥ 25000, determine loc_data, check
payment_loc_data = true?
    play_back www.skpytn.com/livestreaming
Else
    Send error_message
```

If the rule is violated, an error message may be generated, which may confirm that a fraudulent event has occurred. In at least some embodiments, the rule management module 310 may be configured to provide information related to the user and the rule that has been violated to the action module 158. The action module 158 (shown in FIG. 2) is configured to initiate at least one action on the user. The actions initiated by the action module 158 may be construed to be positive or negative in effect. Some examples of negative actions may include, but are not limited to, blocking a playback of content for the user, logging the user out on multiple devices, restricting all access from the user's account and blacklisting the user, causing the display of an overlay on a screen displaying content that the user is not entitled to access, disallowing the user from providing false review/rating, etc. It is noted that action module 158 is configured to increase a severity of negative actions based on the violation of the rule and the user breach profile. In one example embodiment, increasing the severity may include increasing the number of actions, types of actions, and the like, taken against the user that may limit the user to commit fraud. However, positive actions can also be taken against the user who committed fraud to motivate the user to subscribe to the content on the digital platform. An example of positive action may include, but is not limited to, providing an offer to watch the non-entitled content at a discounted rate, providing an offer to the user to upgrade the subscription, or adding another location to the user account on a temporary basis (for example, a month or any such time frame), interspersing non-entitled content access with a stream of advertisements, and the like.

As mentioned above, the risk module 308 is also configured to provide the user breach profile and the user interaction data to the risk scoring module 312. In one example embodiment, the risk module 308 is configured to provide the user breach profile and the user interaction data to the risk scoring module 312 upon triggering an action corresponding to the user of the set of users. The risk scoring module 312 is configured to generate a risk profile for the user based on the user breach profiles related to the risk parameters, which includes information related to the current outlier/anomalous behavior as well as the breach history information. To that effect, the risk scoring module 312 is configured to determine a plurality of risk scores vis-à-vis various risk parameters for the user and thereafter label the user as a high-risk user, a moderate-risk user, a low-risk user, etc. Each risk score corresponds to a user breach profile, where the user breach profile indicates which risk parameter is breached and the risk score indicates a score (i.e., a numerical value) related to the breach of the risk parameter. Further, the risk scoring module 312 is configured to update the risk profile for the user upon updating the user breach profile. To that effect, risk scores are updated when the user breach profiles are updated for a user. For example, the risk profile may be updated by the risk scoring module 312 when there is an update in the user breach profile upon detection of new outlier/anomalous behavior at a later time. In an example embodiment, the risk score corresponding to a risk parameter is determined when the user does not have prior breaches and is newly registered to the digital platform, and the risk score is updated when the user is an old user and has prior risk score corresponding to the risk parameter. For example, the prior risk score corresponding to a risk parameter for user A was 0.2 and it was later determined that the risk score for the user A has to be updated to 0.5 based on new breaches/fraudulent interactions with the digital platform. Further, the risk scoring module 312 updates the risk score of the user in real-time when the user interacts with the digital platform. For example, the risk score related to a risk parameter may be reduced if the next interaction of the user does not include a breach of that risk parameter, and the risk score may be increased if the user breaches that risk parameter on his next interaction. Thus, the risk score of the user gets updated dynamically with every interaction of the user with the digital platform irrespective of whether the interactions include a fraud or not. The update of the risk score for every interaction may lead to an update of cumulative risk scores, labels, and risk profiles of the user in real-time. Further, the users decreasing their risk scores may be given targeted incentives and offers to subscribe to the digital platform, and this may lead to making a fraudulent user into a subscribed user. This update of the risk score in real-time may lead to improvement in user experience by providing notifications (such as offers and incentives) upon improvement in their risk score (i.e. reducing risk score). An example assignment of risk scores assigned to users is explained later with reference to FIG. 5.

In at least one embodiment, the plurality of risk scores computed for different parameters may be stored as a user risk profile in a user risk profile pool 370 of the storage module 164. Further, the risk scoring module 312 generates the risk profile including at least one of the risk scores, cumulative risk score, and the label for a user upon determining that the user is new and does not have a risk profile. The risk scoring module 312 may update the risk profile including the updated risk scores and updated label for the user upon determining that the user already has a risk profile. It is noted that the risk profile creation is performed in real-time by aggregating the current breach information (i.e., the outliers and the anomalies) along with the breach history of the user.

In at least one embodiment, a cumulative risk score may be generated based on risk scores corresponding to different parameters, and a user may be classified or labeled into a category from among a plurality of categories based on the cumulative score. In one illustrative example, the user may be assigned a label based on a security threat level of the user. Further, the cumulative risk score and the label assigned to the user may be included in the risk profile of the user. For example, the user may have a user risk profile that indicates the label (such as L1, L2, and L3, high-risk user, medium-risk user, low-risk user) assigned to the user, and individual and cumulative risk scores of the user. In a general sense, the term 'security threat level' may be indicative of the possibility of a user committing fraud and, in a deeper context, may be indicative of the possibility of the user posing a threat to the content provider's content rights as well as to the access rights/privileges of other users associated with the content provider's platform. In one illustrative example, labels associated with the security threat levels may be $L_1$ (i.e., very low threat with risk score in the range of 0-0.1), $L_2$ (i.e., low threat with risk score in the range of 0.1-0.2). $L_3$ (i.e., medium threat with risk score in the range of 0.3-0.5), $L_4$ (i.e., high threat with risk score in the range of 0.6-0.8), and $L_5$ (i.e., very high threat with risk score in the range of 0.9-1). As such, the user with a risk score of 0.1 may be labeled as $L_1$ indicating that the security threat posed by the user is very low. In another illustrative example, users may be assigned labels based on type of breach committed by the user. For example, labels may be associated with payment issues, accessing content on multiple devices, requesting a plurality of playbacks within a short duration, accessing content from multiple locations simultaneously, accessing content listed only for premium subscribers, and the like. In yet another illustrative example, the plurality of users of the content provider platform may be labeled with color codes indicating security threats posed by them. For example, users labeled with a green color code are users, who do not show any anomalous behavior, whereas users labeled with a red color code are common defaulters performing fraud activities on the digital platform, and users labeled with a yellow color code are users who show behavior different from normal user behavior.

In an example embodiment, the labels may be used by the various modules of the risk mitigation module 156 to monitor user interaction data collected from the plurality of users in further interactions for potential breaches. For example, user interaction data related to users with red and yellow codes in the digital platform may be closely monitored to determine future frauds. In another example embodiment, the risk profile may be used to monitor user interaction data of the set of users in their further interactions with the digital platform, and in some cases, elements (such as risk scores and labels) of the risk profile may be used to monitor the user interaction data of the user for potential breaches.

Figure 6:
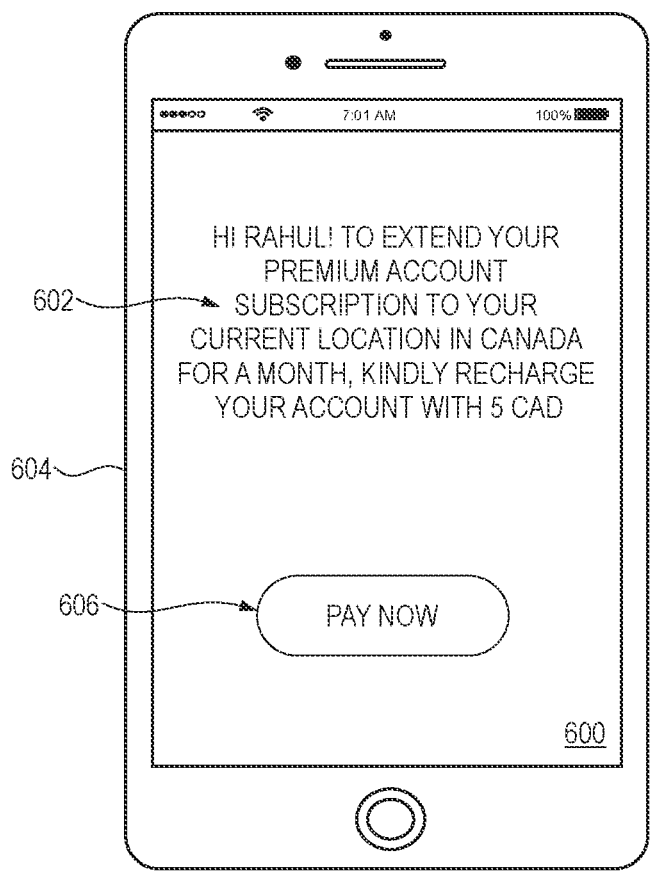
FIG. 6 depicts an example representation of a UI displaying a notification to a user, in accordance with an embodiment of the invention.

In at least one example embodiment, these labels may be used by the action module 158 to provide incentives for the user. In one illustrative example, the user with the label $L_1$ posing a very low security threat to the digital platform may be provided an option to utilize services of the content provider at a subsidized rate (e.g., 20% reduction in payment charges to access premium services of the digital platform). In such cases, the system 150 may be caused to display a message or a notification for the user 102 on a user interface (UI) of a corresponding electronic device. An example message displayed to the user is shown in FIG. 6.

The data analyzer 314 is configured to periodically analyze the performance of the rules over a predefined time, such as on a daily, weekly, monthly, quarterly or annual basis. In at least one example embodiment, the plurality of rules in the configuration store 320 may be dynamically updated (and or adapted) based on the performance analysis. For example, if a current set of rules are still resulting in a large number of frauds, then new rules can be added, existing rules may be reconfigured with stricter threshold values, one or more layers of scrutiny may be added for fraud detection, and the like. However, if the current set of rules is resulting in very low number of frauds and, in some cases, also negatively impacting genuine users, then some rules can be deleted, existing rules may be reconfigured with laxer threshold values, number of layers of scrutiny reduced, and the like. Such dynamic adaptation of the plurality of rules creates a scope for runtime manual and/or automatic updates of the threshold values and the plurality of rules.

In one example scenario, a rule may be defined to detect occurrence of fraud related to sharing of account credentials with non-entitled users. The rule may be configured to check the number of playback URL requests to unique content items within a predefined time from multiple locations. If the threshold value is set to '4', i.e. 4 playback URL requests to unique content items may be made within an hour from multiple locations, and if there is still a high amount of 'no fraud activity' reported, then the threshold value may be reduced to 3 or 2. Alternatively, if several complaints from genuine users are received, then the threshold value may be increased to 5 or 6 playback URLs within an hour. In one embodiment, the data analyzer 314 is further configured to update the baseline threshold values and baselines user profiles for the data filter module 302, the anomaly detector 306, the first level breach analyzer 304, and the rule management module 310.

Figure 4:
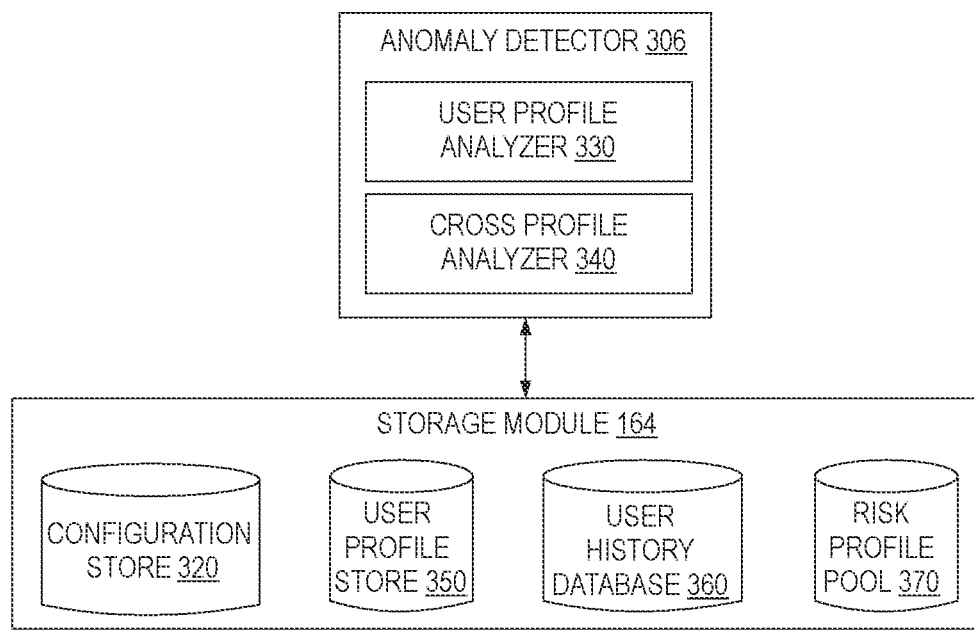
FIG. 4 is a block diagram representation of an anomaly detector included in the risk mitigation module of FIG. 3 in accordance with an embodiment of the invention.

FIG. 4 is a block diagram representation 400 of the anomaly detector 306 included in the risk mitigation module 156, in accordance with an embodiment of the invention. As explained with reference to FIG. 3, the risk mitigation module 156 receives the user interaction data corresponding to a plurality of users of streaming content. In addition to the data filter module 302 (shown in FIG. 3), the anomaly detector 306 is also configured to receive the user interaction data.

The anomaly detector 306 is depicted to include a user profile analyzer 330 and a cross profile analyzer 340. On receiving user interaction data for each user, the user profile analyzer 330 is configured to fetch a corresponding baseline user profile from a user profile store 350 in the storage module 164. The user profile store 350 may store baseline user profiles corresponding to a large number of users associated with the platform of the content provider. Each baseline user profile may include user account information along with attribute-related information such as a number of devices, type of devices, IP address, one or more user locations, frequency of logins, content preferences, content genre preferences, typical time slots for watching content, and the like. The anomaly detector 306 is configured to compare the user interaction data received corresponding to a user and match the attributes (such as number of devices, type of devices, etc) therein with the attribute-related information in the fetched baseline user profile. If a substantial match is observed (for example, minor variation in content selection, time slots for watching content may be allowed), then the user profile analyzer 330 determines that there is no anomaly in the user interaction data for the respective user. However, if the attributes do not match, for example a new device or a new IP address, or a completely new location is identified in the user interaction data, which does not match with historical information stored in the baseline user profile, then the user profile analyzer 330 may determine the presence of an anomaly in the user interaction data for the respective user.

The cross-profile analyzer 340 is also configured to further assess the user interaction data for each user vis-à-vis behavior of other users in the common comparison frame (such as same time duration, or within the same location, or any similar criteria). For example, if the user interaction data indicates that a user has requested 10 playback URLs within a given time duration, whereas the maximum number of playback URLs requested by 99 percentile of overall number of users of streaming content have only requested two URLs, then such a user behavior may be considered to be anomalous. Similarly, if 99 percentile of overall users are associated with only one location for requesting content, whereas one user has requested playback URL from five different locations in a given time frame (say one week), then such a user behavior may be considered to be anomalous. It is noted that the limit of '99 percentile' or the time duration threshold value of one week are mentioned herein for exemplary purposes and any such baseline limits and threshold values may be selected from the configuration store 320 of the storage module 164. Accordingly, the anomaly detector 306 is configured to detect anomalies in user interaction data for each user by comparing the attributes in the user interaction data with attributes in a baseline user profile and with behavioral attributes of other users within a common comparison frame. The detected anomalies are further forwarded to a breach analyzer (such as the first level breach analyzer 304).

Figure 5:
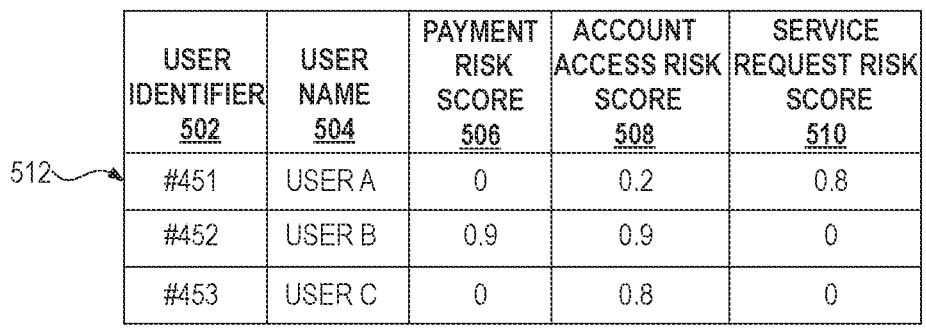
FIG. 5 shows a portion of a simplified tabular representation for illustrating an example assignment of risk scores to a plurality of users, in accordance with an embodiment of the invention.

FIG. 5 shows a portion of a simplified tabular representation 500 for illustrating an example assignment of risk scores to a plurality of users, in accordance with an embodiment of the invention. It is understood that a representation in a tabular form is depicted for example purposes and that any data structure may be used for representing the risk scores of the users.

The tabular representation 500 (hereafter referred to as 'table 500'), depicts a plurality of columns such as columns 502, 504, 506, 508, and 510, which are associated with column headers 'User Identifier'. 'User Name'. 'Payment risk score', 'account access risk score', 'service request risk score', respectively. It is noted that the tabular representation 500 may include more or fewer number of columns than those depicted in FIG. 5. Moreover, risk parameters represented by the columns may not be limited to risk parameters, such as 'Payment'. 'Account Access' and 'Service Request', as depicted in the tabular representation 500 and, indeed a variety of other risk parameters that define abnormal activity or security threats to a digital platform may be recorded in the tabular representation 500. Further, risk scores of users related to each risk parameter may be derived by the risk scoring module 312 (shown in FIG. 3) of the risk mitigation module 156 of the system 150 (shown in FIG. 2). In at least some embodiments, one or more machine learning models may be deployed to learn the behavior of users over time to identify risk potential and thereby compute a risk score for each risk parameter, as shown in the tabular representation 500. As such, each risk score is indicative of the potential of the user to commit a fraud vis-à-vis the given risk parameter (such as payment, account access, etc.). More specifically, a higher risk score is indicative of a higher possibility of the user committing fraud (i.e., the user is a high-risk user) in his further interactions with the digital platform.

The column 502 associated with the column header 'User Identifier' includes entries related to unique identifiers of users of the digital platform (e.g., OTT platform), and the column 504 includes entries related to registered names of users of the digital platform. The column 506 includes entries related to payment-related risk scores for a plurality of users. In one illustrative example, a user may have subscribed to a video platform with an auto-renewal option for every month. However, the user's bank may decline the transaction due to insufficient funds. Alternatively, the credit card on record for auto-billing the user's account may have expired. In cases, where the payment is delayed or declined, the risk score of the user may be higher to indicate a risk of not receiving payment from the user.

The column 508 includes risk score entries related to account access for the plurality of users. In scenarios, where the user has accessed the account from multiple devices simultaneously, or from multiple locations, or from multiple devices at multiple locations (which may be indicative of sharing of account credentials), or accessed non-entitled content, etc., the risk score for the corresponding user may be reflective of such events/transgressions. In one illustrative example, the user may have paid for availing services (e.g., playback of live streaming content) in a country (e.g., India) and may be accessing the services from a different country (e.g., Canada). Accordingly, a risk score for such a user may be higher on account of a perceived threat of fraudulent access.

The column 510 depicts risk score entries related to service requests for the plurality of users. For example, a user requesting a service (e.g., playback of 20 songs/hour) indicates normal activity. However, if the user request playback of 100 songs/hour, the service requests of the user indicate anomalous behavior. As such, the risk score of the user indicates a high-risk score for service requests.

As an example, row 512 identifies a user 'USER A' with a user identifier '#451' having a risk score of '0' related to payment, '0.2' related to account access, and '0.8' related to service requests. A cumulative risk score for the 'USER A' is generated based on risk scores corresponding to different parameters (in this example, the cumulative score being '1'). The 'USER A' may be classified or labeled into $L_5$ (i.e., very high threat with a risk score in the range of 0.9-1) category from among a plurality of categories based on the cumulative score.

FIG. 6 depicts an example representation of a UI 600 displaying a notification 602 to a user (not shown in FIG. 6), in accordance with an embodiment of the invention. The UI 600 may be displayed on a display screen of a user's electronic device 604. The user's electronic device 604 is depicted to be a smartphone for illustration purposes. Further, the notification 602 is depicted as a Short Message Service (SMS) notification for illustration purposes. In some embodiments, the user's electronic device 604 may be an electronic device, such as a laptop or tablet device, and the notification 602 may be embodied as one of an email notification, a chat or an instant message notification, a Web browser notification, an Operating System (OS) notification, and the like.

The notification 602 is exemplarily depicted to include the text 'HI RAHUL! TO EXTEND YOUR PREMIUM ACCOUNT SUBSCRIPTION TO YOUR CURRENT LOCATION IN CANADA FOR A MONTH. KINDLY RECHARGE YOUR ACCOUNT WITH 5 CAD'. As explained with reference to FIG. 5, a user may have paid for streaming premium content in India, however, the user may have switched location to Canada and, accordingly may request access to the premium content from Canada. In such a scenario, a risk score for the account access parameter may be high for the user.

In one illustrative example, the risk scoring module 312 shown in FIG. 3 may associate a label $L_2$ with the user, indicating 'lower threat' and the user is not a serious fraudster. Further, the risk scoring module 312 may assign a label 'temporary'. The action module 158 (shown in FIG. 2) may be configured to use such information to determine an 'upsell opportunity' and accordingly may provide a SMS notification or a push notification, such as the notification 602, to the user on the user's electronic device 604 which the user utilized to access premium content on the digital platform. The notification 602 includes a tab 606 capable of receiving user selection. Further, the tab 606 is exemplarily depicted to be associated with text 'PAY NOW'. A touch or click selection input on the tab 606 may be configured to initiate a payment session for availing the services of the digital platform in Canada at a discounted rate.

Figure 7A:
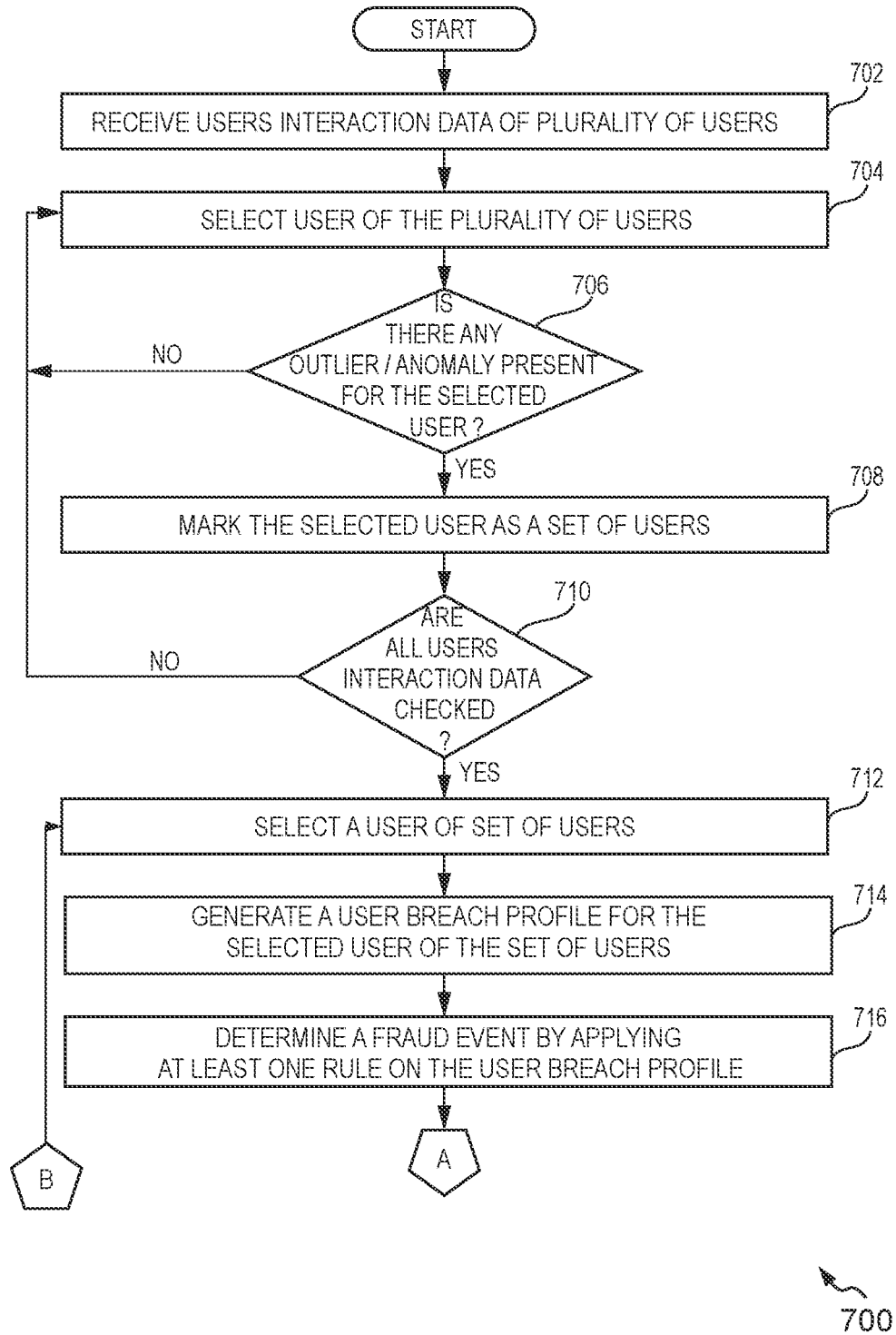
FIGS. 7A and 7B depict a flow chart of a method for mitigating the risk of fraud related to steaming content consumption, in accordance with an embodiment of the invention.
Figure 7B:
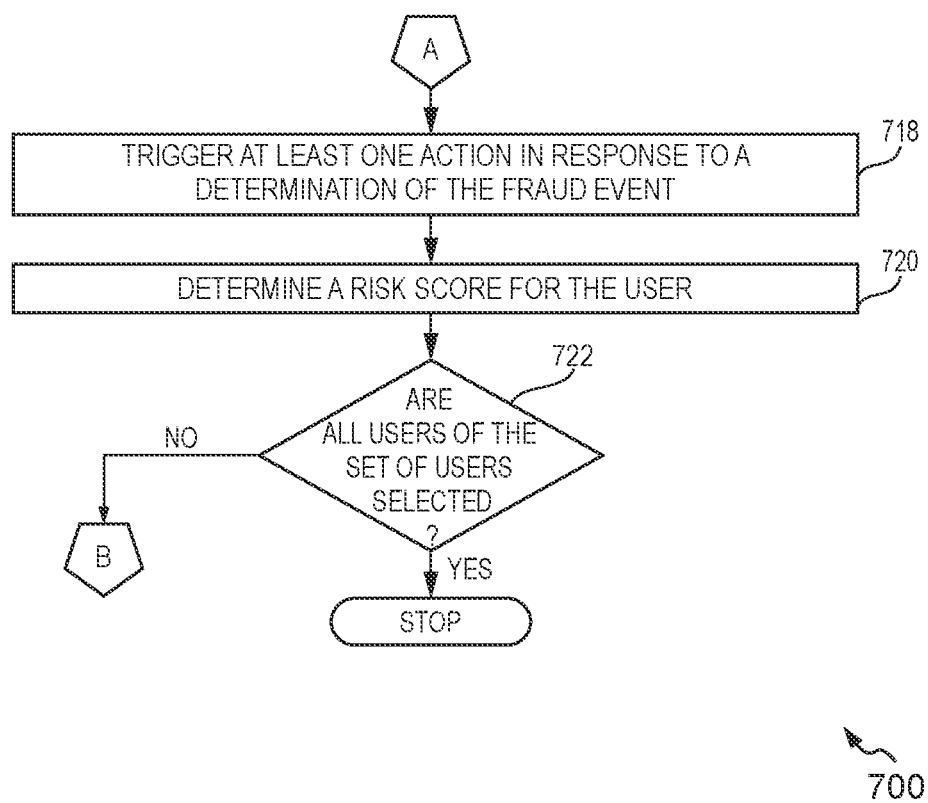

FIGS. 7A and 7B depict a flow chart of a method 700 for mitigating the risk of fraud related to steaming content consumption, in accordance with an embodiment of the invention. The various steps and/or operations of the flow chart, and combinations of steps/operations in the flow chart, may be implemented by, for example, hardware, firmware, a processor, circuitry and/or by a system such as the system 150 explained with reference to FIG. 1 to 6 and/or by a different device associated with the execution of software that includes one or more computer program instructions. The method 70) starts at operation 702.

At step 702 of the method 700, users' interaction data corresponding to a plurality of users of a digital platform related to streaming content is received by a server system, such as the system 150 explained with reference to FIGS. 1 to 6. The users' interaction data may be received in real-time from users' electronic devices such as the electronic device 104 shown in FIG. 1.

At step 704 of the method 700, a user from the plurality of the users is selected by the system 150. Any sequential selection methodologies/algorithms (such as round-robin) can be implemented for the selection of a user from the plurality of users.

At step 706 of the method 700, it is determined whether there is at least one of an outlier event and an anomaly in user interaction data associated with the user. The outlier event and the anomaly indicate an occurrence of fraudulent interaction of the set of users with the digital platform. Upon determination of the absence of the outlier event and the anomaly in the user interaction data, the method 700 returns to step 704 for the selection of another user from the plurality of users. The method 700 moves to step 708, upon determining presence of at least one of the outlier event and the anomaly in the user interaction data.

At step 708 of the method 700, the user is categorized/marked as a set of users. The user is associated with the user interaction data in which the presence of at least one of the outlier event and the anomaly is determined.

At step 710 of the method 700, it is determined whether users' interaction data of the plurality of users is analyzed to determine the presence of at least one of the outlier event and the anomaly. If any of the user's interaction data is not analyzed then the method 700 returns to step 704 for the selection of that user. The method 700 moves to step 712 upon determining that the users' interaction data of the plurality of users is analyzed.

At step 712 of the method 700, a user is selected from the set of users. The set of users may include at least one user associated with user interaction data in which at least one of the outlier event and the anomaly is present. Any sequential selection methodologies/algorithms (such as round-robin) can be implemented for the selection of the user from the set of users.

At step 714 of the method 700, a user breach profile is generated for the selected user of the set of users. The user breach profile includes information related to at least one of the outlier event and the anomaly in user interaction data of the selected user and a breach history of the selected user.

At step 716 of the method 700, a fraud event is determined by applying at least one rule on the user breach profile of each user of the set of users.

At step 718 of the method 700, at least one action is triggered in response to the determination of the fraud event for each user of the set of users.

At step 720 of the method 700, a risk score is determined for each user of the set of users based on the user breach profile to monitor user interaction data of the respective user. The determination of risk score is explained in detail with reference to FIG. 5, and therefore not reiterated here for the sake of brevity.

At step 722 of the method 700, it is determined whether all the users of the set of users are selected. If it is determined that all the users of the set of users are not selected, the method 700 returns to step 712 for the selection of the next user. The method 700 ends upon determining that all the users of the set of users are selected.

A method for mitigating the risk of fraud related to streaming content consumption is explained next with reference to FIG. 8.

Figure 8:
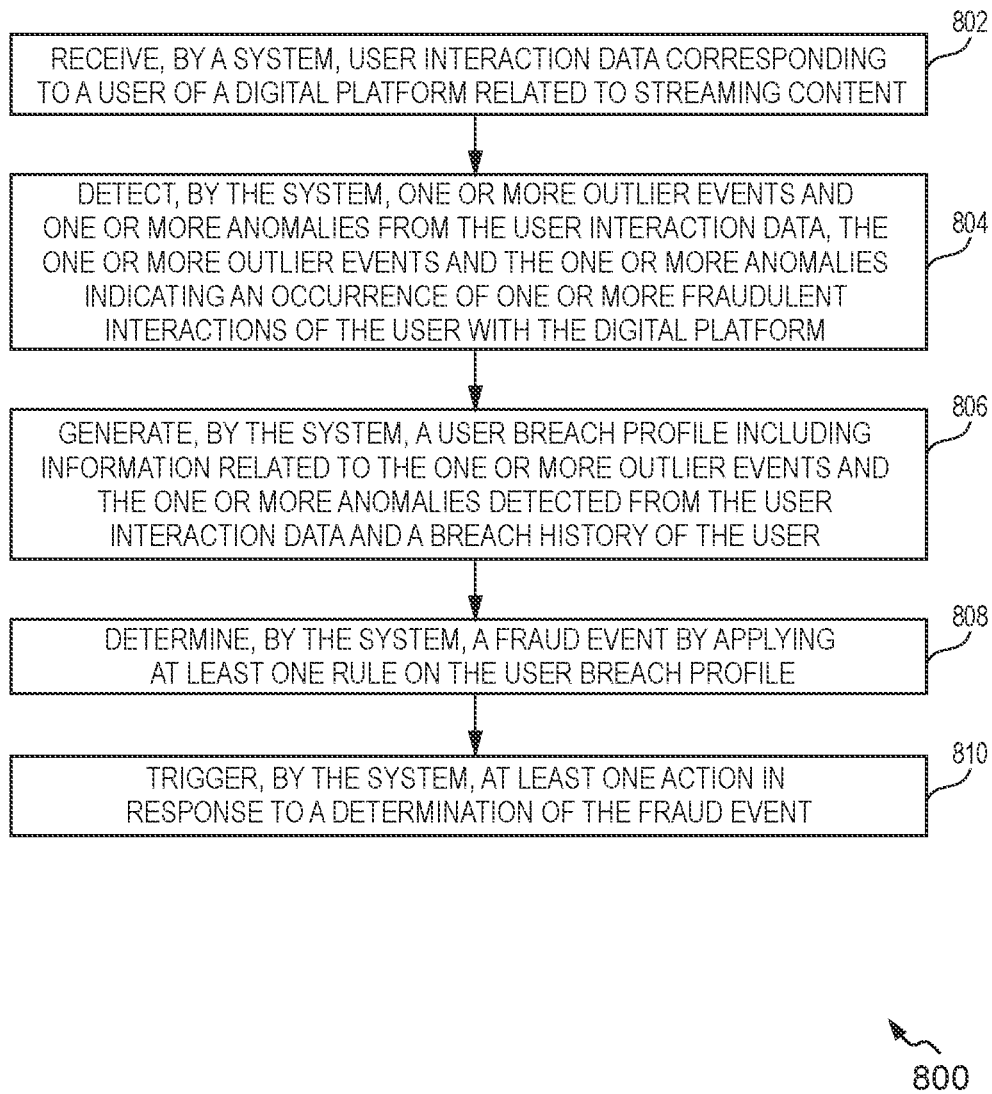
FIG. 8 is a flow diagram of a method for mitigating the risk of fraud related to streaming content consumption, in accordance with an embodiment of the invention.

FIG. 8 is a flow diagram of a method 800 for mitigating the risk of fraud related to streaming content consumption, in accordance with an embodiment of the invention. The various steps and/or operations of the flow diagram, and combinations of steps/operations in the flow diagram, may be implemented by, for example, hardware, firmware, a processor, circuitry and/or by a system such as the system 150 explained with reference to FIG. 1 to 6 and/or by a different device associated with the execution of software that includes one or more computer program instructions. The method 800 starts at operation 802.

At operation 802 of the method 800, user interaction data from a user of a digital platform related to streaming content is received by a server system, such as the system 150 explained with reference to FIGS. 1 to 6. The user interaction data may be received in real-time from a user's electronic device such as the electronic device 104 shown in FIG. 1.

At operation 804 of the method 800, one or more outlier events and one or more anomalies are detected from the user interaction data corresponding to a user in real-time. The one or more outlier events and the one or more anomalies indicating a presence of one or more fraudulent interactions of the user with the digital platform. The detection of the one or more outlier events and the one or more anomalies from the user interaction data may be performed as explained with reference to FIGS. 3 and 4 and is not explained again herein.

At operation 806 of the method 800, a user breach profile is generated including information related to the one or more outlier events and the one or more anomalies detected from the user interaction data and a breach history of the user.

At operation 808 of the method 800, a fraud event is determined by applying at least one rule on the user breach profile.

At operation 810 of the method 800, at least one action is triggered in response to a determination of the occurrence of the fraud event, where the at least one action is triggered in relation to the user interaction data. Further, the at least one action is configured to mitigate the risk of fraud related to streaming content consumption.

As explained with reference to FIG. 3, the actions may be configured to have a positive or a negative effect.

Various embodiments disclosed herein provide numerous technical advantages. More specifically, the embodiments disclosed herein suggest techniques for detecting frauds in real-time while retaining a rich quality of viewing experience. The user is not always penalized for anomalous behavior as in the case of conventional mechanisms and the user may be provided with incentives that curb the user's instincts to commit fraud. Moreover, a baseline of a user behavior is used to detect deviations in the user behavior which helps to identify frauds early. Furthermore, rules and threshold values that evaluate fraud events are periodically evaluated and dynamically adapted based on performance. Such dynamic update of rules (i.e., pausing rules, adding new rules, adapting rule threshold values) creates scope for manual and automatic updates during runtime, thereby vastly improving the ability to capture new frauds during the initial trial itself.

Although the present invention has been described with reference to specific exemplary embodiments, it is noted that various modifications and changes may be made to these embodiments without departing from the broad spirit and scope of the present invention. For example, the various operations, blocks, etc., described herein may be enabled and operated using hardware circuitry (for example, complementary metal oxide semiconductor (CMOS) based logic circuitry), firmware, software and/or any combination of hardware, firmware, and/or software (for example, embodied in a machine-readable medium). For example, the apparatuses and methods may be embodied using transistors, logic gates, and electrical circuits (for example, application-specific integrated circuit (ASIC) circuitry and/or Digital Signal Processor (DSP) circuitry).

Particularly, the system 150 and its various components such as the processor 152, the memory 154, the I/O module 160, and the communication module 162 may be enabled using software and/or using transistors, logic gates, and electrical circuits (for example, integrated circuit circuitry such as ASIC circuitry). Various embodiments of the present invention may include one or more computer programs stored or otherwise embodied on a computer-readable medium, wherein the computer programs are configured to cause a processor or the computer to perform one or more operations (for example, operations explained herein with reference to FIGS. 7 and 8). A computer-readable medium storing, embodying, or encoded with a computer program, or similar language, may be embodied as a tangible data storage device storing one or more software programs that are configured to cause a processor or computer to perform one or more operations. Such operations may be, for example, any of the steps or operations described herein. In some embodiments, the computer programs may be stored and provided to a computer using any type of non-transitory computer-readable media. Non-transitory computer-readable media include any type of tangible storage media. Examples of non-transitory computer-readable media include magnetic storage media (such as floppy disks, magnetic tapes, hard disk drives, etc.), optical magnetic storage media (e.g., magneto-optical disks), CD-ROM (compact disc read-only memory). CD-R (compact disc recordable), CD-R/W (compact disc rewritable), DVD (Digital Versatile Disc). BD (Blu-ray (registered trademark) Disc), and semiconductor memories (such as mask ROM, PROM (programmable ROM). EPROM (erasable PROM), flash ROM. RAM (random access memory), etc.). Additionally, a tangible data storage device may be embodied as one or more volatile memory devices, one or more non-volatile memory devices, and/or a combination of one or more volatile memory devices and non-volatile memory devices. In some embodiments, the computer programs may be provided to a computer using any type of transitory computer-readable media. Examples of transitory computer-readable media include electric signals, optical signals, and electromagnetic waves. Transitory computer-readable media can provide the program to a computer via a wired communication line (e.g., electric wires, and optical fibers) or a wireless communication line.

Various embodiments of the present invention, as discussed above, may be practiced with steps and/or operations in a different order, and/or with hardware elements in configurations, which are different than those which are disclosed. Therefore, although the invention has been described based upon these exemplary embodiments, it is noted that certain modifications, variations, and alternative constructions may be apparent and well within the spirit and scope of the invention.

Although various exemplary embodiments of the present invention are described herein in a language specific to structural features and/or methodological acts, the subject matter defined in the appended claims is not necessarily limited to the specific features or acts described above. Rather, the specific features and acts described above are disclosed as exemplary forms of implementing the claims.

What is claimed is:

1. A computer-implemented method for mitigating the risk of frauds related to streaming content consumption, the method comprising:
receiving, by a system, users' interaction data corresponding to a plurality of users of a digital platform related to streaming content;
determining, by the system, a set of users from the plurality of users based on the users' interaction data, the set of users determined based on presence of at least one of an outlier event and an anomaly in each user's respective user interaction data, the outlier event and the anomaly indicating an occurrence of fraudulent interaction by the set of users with the digital platform, wherein determining the set of users from the plurality of users based on the users' interaction data comprises:
analyzing user interaction data corresponding to an individual user of the plurality of users to extract one or more user characteristic values; and
comparing the one or more user characteristic values with respective baseline threshold values to determine the presence of the outlier event in the user interaction data corresponding to the individual user, wherein the baseline threshold values are modified dynamically based on an analysis of detection of the outlier event; and
performing for each user of the set of users:
generating, by the system, a user breach profile for the user of the set of users, the user breach profile comprising information related to at least one of the outlier event and the anomaly in user interaction data of the user of the set of users and a breach history of the user of the set of users;
determining, by the system, a fraud event by applying at least one rule on the user breach profile;
triggering, by the system, at least one action in response to a determination of the fraud event; and
upon triggering the at least one action, determining, by the system, a risk score for the user of the set of users based on the user breach profile to monitor user interaction data of the user of the set of users.

2. The method as claimed in claim 1, wherein determining the set of users from the plurality of users based on the users' interaction data further comprises:
upon determining the presence of the outlier event in the user interaction data corresponding to the individual user, categorizing the individual user as one of the set of users.

3. The method as claimed in claim 2, wherein determining the set of users from the plurality of users based on the users' interaction data further comprises:
receiving a baseline user profile corresponding to the individual user and behavioral attributes of other users within a common comparison frame;
comparing attributes in the user interaction data corresponding to the individual user with attributes in the baseline user profile of the respective user and the behavioral attributes of other users within the common comparison frame;
determining the presence of the anomaly in the user interaction data corresponding to the individual user when the attributes in the user interaction data corresponding to the individual user do not match with the attributes in the baseline user profile of the respective user and the behavioral attributes of other users within the common comparison frame; and
upon determining the presence of the anomaly in the user interaction data corresponding to the individual user, categorizing the individual user as one of the set of users.

4. The method as claimed in claim 1, further comprising:
identifying users' interaction data corresponding to the set of users from the users' interaction data corresponding to the plurality of users;
identifying at least one of a user identifier, a user's device, and a user's IP address from the identified users' interaction data corresponding to the set of users; and
retrieving breach history related to previous breaches committed by an individual user from the set of users, wherein the breach history is retrieved based on the at least one of the user identifier, the user's device, and the user's IP address.

5. The method as claimed in claim 4, wherein the breach history comprises information related to the previous breaches committed by the individual user and information related to interactions of the individual user with the digital platform.

6. The method as claimed in claim 1, wherein determining the risk score comprises determining the risk score related to each risk parameter of a plurality of risk parameters, for each user of the set of users, wherein the plurality of risk parameters include payment, account access, and service request, and wherein the risk score is indicative of a tendency of each user of the set of users to commit a fraud related to any of the risk parameters.

7. The method as claimed in claim 6, further comprising:
generating a cumulative risk score for each user of the set of users based on the risk score corresponding to each of the plurality of risk parameters;
assigning a label to each user of the set of users based on the generated cumulative risk score, wherein the label is indicative of the possibility of the user of the set of users committing a fraud;
generating a risk profile for each user of the set of users, the risk profile comprising at least one of risk scores, the cumulative risk score, and the label; and
monitoring users' interaction data corresponding to the set of users based at least on risk profiles of the set of users.

8. The method as claimed in claim 6, further comprising updating the risk score of each user of the set of users based on an interaction of each user of the set of users with the digital platform.

9. The method as claimed in claim 1, further comprising electronically analyzing performance of the plurality of rules over a predefined time; and
updating the plurality of rules based on the analysis of the performance of the plurality of rules.

10. The method as claimed in claim 1, wherein triggering the at least one action includes increasing severity of the at least one action based on the at least one rule and the user breach profile.

11. A system for mitigating the risk of frauds related to streaming content consumption, the system comprising:
memory for storing instructions; and
a processor configured to execute the instructions and thereby cause the system, at least in part, to:

receive users' interaction data corresponding to a plurality of users of a digital platform related to streaming content;
determine a set of users from the plurality of users based on the users' interaction data, the set of users determined based on presence of at least one of an outlier event and an anomaly in each user's respective user interaction data, the outlier event and the anomaly indicating an occurrence of fraudulent interaction by the set of users with the digital platform, wherein to determine the set of users from the plurality of users based on the users' interaction data, the system is caused, at least in part, to:
analyze user interaction data corresponding to an individual user of the plurality of users to extract one or more user characteristic values; and
compare the one or more user characteristic values with respective baseline threshold values to determine the presence of the outlier event in the user interaction data corresponding to the individual user,
wherein the baseline threshold values are modified dynamically based on an analysis of detection of the outlier event; and
perform for each user of the set of users:
generating a user breach profile for the user of the set of users, the user breach profile comprising information related to at least one of the outlier event and the anomaly in user interaction data of the user of the set of users and a breach history of the user of the set of users;
determining a fraud event by applying at least one rule on the user breach profile;
triggering at least one action in response to a determination of the fraud event; and
upon triggering the at least one action, determining a risk score for the user of the set of users based on the user breach profile to monitor user interaction data of the user of the set of users.

12. The system as claimed in claim 11, wherein to determine the set of users from the plurality of users based on the users' interaction data, the system is further caused, at least in part, to:
upon a determination of the presence of the outlier event in the user interaction data corresponding to the individual user, categorize the individual user as one of the set of users.

13. The system as claimed in claim 12, wherein to determine the set of users from the plurality of users based on the users' interaction data, the system is further caused, at least in part, to:
receive a baseline user profile corresponding to the individual user and behavioral attributes of other users within a common comparison frame;
compare attributes in the user interaction data corresponding to the individual user with attributes in the baseline user profile of the respective user and the behavioral attributes of other users within the common comparison frame;
determine a presence of the anomaly in the user interaction data corresponding to the individual user when the attributes in the user interaction data corresponding to the individual user do not match with the attributes in the baseline user profile of the respective user and the behavioral attributes of other users within the common comparison frame; and
upon a determination of the presence of the anomaly in the user interaction data corresponding to the individual user, categorize the individual user as one of the set of users.

14. The system as claimed in claim 11, wherein the system is further caused, at least in part, to:
identify users' interaction data corresponding to the set of users from the users' interaction data corresponding to the plurality of users;
identify at least one of a user identifier, a user's device, and a user's IP address from the identified users' interaction data corresponding to the set of users; and
retrieve breach history related to previous breaches committed by an individual user from the set of users, wherein the breach history is retrieved based on the at least one of the user identifier, the user's device, and the user's IP address.

15. The system as claimed in claim 14, wherein the breach history comprises information related to the previous breaches committed by the individual user and information related to interactions of the individual user with the digital platform.

16. The system as claimed in claim 11, wherein, for determination of the risk score, the system is further caused, at least in part, to:
determine the risk score related to each risk parameter of a plurality of risk parameters, for each user of the set of users, wherein the plurality of risk parameters include payment, account access, and service request, and wherein the risk score is indicative of a tendency of each user of the set of users to commit a fraud related to any of the risk parameters.

17. The system as claimed in claim 16, wherein the system is further caused, at least in part, to:
generate a cumulative risk score for each user of the set of users based on the risk score corresponding to each of the plurality of risk parameters;
assign a label to each user of the set of users based on the generated cumulative risk score, wherein the label is indicative of the possibility of the user of the set of users committing a fraud;
generate a risk profile for each user of the set of users comprising at least one of risk scores, cumulative risk score, and label; and
monitor users' interaction data corresponding to the set of users based at least on risk profiles of the set of users.

18. The system as claimed in claim 16, wherein the system is further caused, at least in part, to update the risk score of each user of the set of users based on an interaction of each user of the set of users with the digital platform.

19. The system as claimed in claim 11, wherein the system is further caused, at least in part, to:
electronically analyze performance of the plurality of rules over a predefined time; and
update the plurality of rules based on the analysis of the performance of the plurality of rules.

20. A computer-implemented method for mitigating the risk of frauds related to streaming content consumption, the method comprising:
receiving, by a system, user interaction data corresponding to a user of a digital platform related to streaming content;
detecting, by the system, one or more outlier events and one or more anomalies from the user interaction data, the one or more outlier events and the one or more anomalies indicating a presence of one or more fraudulent interactions of the user with the digital platform, wherein detecting the one or more outlier events and one or more anomalies from the user interaction data comprises:
  analyzing the user interaction data corresponding to the user to extract one or more user characteristic values; and
  comparing the one or more user characteristic values with respective baseline threshold values to determine the presence of the one or more outlier events in the user interaction data corresponding to the individual user,
  wherein the baseline threshold values are modified dynamically based on an analysis of detection of the one or more outlier events;
generating, by the system, a user breach profile comprising information related to the one or more outlier events and the one or more anomalies detected from the user interaction data and a breach history of the user;
determining, by the system, a fraud event by applying at least one rule on the user breach profile; and
triggering, by the system, at least one action in response to a determination of the fraud event.

\* \* \* \* \*